United States Patent
Song et al.

(10) Patent No.: US 10,140,947 B2
(45) Date of Patent: Nov. 27, 2018

(54) FLEXIBLE DISPLAY SCREEN, DISPLAY DEVICE, AND DISPLAY METHOD APPLIED TO FLEXIBLE DISPLAY SCREEN

(71) Applicant: BOE Technology Group Co., Ltd., Beijing (CN)

(72) Inventors: Song Song, Beijing (CN); Kazuyoshi Nagayama, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 15 days.

(21) Appl. No.: 15/300,995

(22) PCT Filed: Jan. 29, 2016

(86) PCT No.: PCT/CN2016/072823
§ 371 (c)(1),
(2) Date: Sep. 30, 2016

(87) PCT Pub. No.: WO2017/004985
PCT Pub. Date: Jan. 12, 2017

(65) Prior Publication Data
US 2017/0186400 A1    Jun. 29, 2017

(30) Foreign Application Priority Data
Jul. 3, 2015    (CN) .......................... 2015 1 0388463

(51) Int. Cl.
*G09G 5/00*    (2006.01)
*G06F 1/16*    (2006.01)
(Continued)

(52) U.S. Cl.
CPC ........... *G09G 5/003* (2013.01); *G06F 1/1652* (2013.01); *G09F 9/301* (2013.01); *G09G 3/20* (2013.01);
(Continued)

(58) Field of Classification Search
CPC ............. G09G 5/003; G09G 2330/023; G09G 2330/026; G09G 2330/027; G09G 2380/02; G06F 1/1652
See application file for complete search history.

(56) References Cited

U.S. PATENT DOCUMENTS

| | | | |
|---|---|---|---|
| 2005/0041012 A1* | 2/2005 | Daniel | G06F 1/1601 345/156 |
| 2006/0061555 A1* | 3/2006 | Mullen | G06F 1/1624 345/169 |

(Continued)

FOREIGN PATENT DOCUMENTS

| | | |
|---|---|---|
| CN | 102522049 A | 6/2012 |
| CN | 102736691 A | 10/2012 |

(Continued)

OTHER PUBLICATIONS

Jun. 13, 2017—(CN) Second Office Action Appn 201510388463.4 with English Tran.

(Continued)

*Primary Examiner* — Ariel Balaoing
(74) *Attorney, Agent, or Firm* — Banner & Witcoff, Ltd.

(57) ABSTRACT

Provided are a flexible display screen having an extending mode and a retracting mode, a display device comprising the flexible display screen and a display method applicable to the flexible display screen, wherein in the extending mode, the entire flexible display screen can be used for displaying, and in the retracting mode, at least a portion of the flexible display screen is curled and an uncurled portion thereof can be used for displaying. According to the flexible display screen, the display device and the display method, a display region of the flexible display screen can be extended in the extending mode so as to enhance visual experience of the user, and at least a portion of the flexible display screen can be curled and retracted in the retracting mode so as to (Continued)

improve the portability. Meanwhile, a partitioned control can be performed to the displaying on the flexible display screen so as to reduce power consumption of the flexible display screen.

17 Claims, 6 Drawing Sheets

(51) Int. Cl.
G09G 3/20 (2006.01)
G09F 9/30 (2006.01)
(52) U.S. Cl.
CPC .......... *G09G 2310/0221* (2013.01); *G09G 2330/023* (2013.01); *G09G 2330/026* (2013.01); *G09G 2330/027* (2013.01); *G09G 2380/02* (2013.01)

(56) References Cited

U.S. PATENT DOCUMENTS

| | | | |
|---|---|---|---|
| 2011/0084893 A1* | 4/2011 | Lee | G06F 1/1649 345/6 |
| 2011/0169793 A1* | 7/2011 | Chen | G09G 3/3677 345/205 |
| 2012/0033353 A1 | 2/2012 | Huang | |
| 2014/0176421 A1* | 6/2014 | Chen | G06F 1/1652 345/156 |
| 2014/0217382 A1 | 8/2014 | Kwon et al. | |
| 2014/0362126 A1 | 12/2014 | Jeong et al. | |

FOREIGN PATENT DOCUMENTS

| | | |
|---|---|---|
| CN | 103399616 A | 11/2013 |
| CN | 103730061 A | 4/2014 |
| CN | 103763409 A | 4/2014 |
| CN | 104300089 A | 1/2015 |
| CN | 104933964 A | 9/2015 |
| WO | 2004114259 A2 | 12/2004 |
| WO | 2014196724 A1 | 12/2014 |

OTHER PUBLICATIONS

Jan. 25, 2017—(CN) First Office Action Appn 201510388463.4 with English Tran.

Apr. 28, 2016—(WO) International Search Report and Written Opinion Appn PCT/CN2016/072823 with English Tran.

Oct. 9, 2017—(CN) Office Action application CN 201510388463.4 with English Translation.

* cited by examiner

FLEXIBLE DISPLAY SCREEN, DISPLAY DEVICE, AND DISPLAY METHOD APPLIED TO FLEXIBLE DISPLAY SCREEN

The application is a U.S. National Phase Entry of International Application No. PCT/CN2016/072823 filed on Jan. 29, 2016, designating the United States of America and claiming priority to Chinese Patent Application No. 201510388463.4 filed on Jul. 3, 2015. The present application claims priority to and the benefit of the above-identified applications and the above-identified applications are incorporated by reference herein in their entirety.

TECHNICAL FIELD

The present disclosure relates to a field of display technology, and more particularly to a flexible display screen having an extending mode and a retracting mode, a display device comprising the flexible display screen, and a display method applicable to the flexible display screen.

BACKGROUND

This part is intended to introduce to the readers technologies in various aspects that might be related to various aspects of the present disclosure, which is believed to be helpful for providing background information to the readers so that they can understand various aspects of the present disclosure better. Thus, it should be understood that it should be read in this sight and should not be regarded as recognition to the prior arts.

With development of display technology in recent years, flexible display technology has been paid more and more attentions. Compared with a conventional display screen, a flexible display screen not only can be lighter and thinner in volume, but also can lower power consumption correspondingly, which is helpful for improving an endurance capability of electronic devices. Meanwhile, the flexible display screen makes it possible that those display requirements such as high resolution and large size become no longer conflict with the portability of a device, due to its properties such as being bendable and good flexibility, and moreover, its durability is also much higher than the conventional screens, so that a probability of accidental damage to the device can be reduced.

The flexible display screen has a wide application prospect due to the above-mentioned advantages. For example, it may be applied to an electronic paper, a mobile phone, a wearable device, or the like. In addition, with people's ever-increasing demands on personal intelligent terminals, the flexible display screen will have a broader application space.

SUMMARY

In sight of many advantages of the flexible display screen, the present disclosure provides a flexible display screen having an extending mode and a retracting mode, which can implement an additional displaying in the extending mode by utilizing a portion of the flexible display screen, and can be curled and retracted in the retracting mode.

Correspondingly, according to an aspect of the present disclosure, there is provided a flexible display screen having an extending mode and a retracting mode, wherein, in the extending mode, the entire flexible display screen can be used for displaying, and in the retracting mode, at least a portion of the flexible display screen is curled and an uncurled portion thereof can be used for displaying.

Optionally, the flexible display screen comprises a main display portion and an additional display portion, the additional display portion having a free end capable of being curled.

Optionally, the additional display portion includes a first additional display portion and a second additional display portion, the second additional display portion being curled in the retracting mode.

Optionally, in the extending mode, the main display portion and the first additional display portion form a plane which can display a main interface, and the second additional display portion forms a curved surface which can display an additional interface.

Optionally, in the retracting mode, the second additional display portion does not perform displaying.

According to another aspect of the present disclosure, there is further provided a display device comprising the flexible display screen described above, wherein the main display portion is located on a front face of the display device, and the additional display portion is located on an edge of the main display portion.

Optionally, in the display device described above, the additional display portion is located at two sides of the main display portion symmetrically.

Optionally, the display device described above further comprises one or more slideable brackets. When the flexible display screen is in the extending mode, at least a portion of the bracket passes through an aperture on a side face of the display device to slide outside the display device, so as to support the additional display portion of the flexible display screen. When the flexible display screen is in the retracting mode, the bracket slides inside the display device, so that the second additional display portion is retracted inside the display device, and the first display portion covers the aperture on the display device.

Optionally, a backside of the display device is transparent, and in the retracting mode, the second additional display portion retracted inside the display device displays through the backside of the display device.

Optionally, the bracket is U-shaped, and in the extending mode, at least a portion of the bracket is pulled outside the display device to support the additional display portion of the flexible display screen.

Optionally, the bracket comprises a plurality of resilient annular members, and when at least a portion of the bracket is pulled outside the display device, the plurality of resilient annular members support the additional display portion together.

Optionally, a first electrode is disposed on one end of the bracket, and a second electrode is disposed on a printed circuit board inside the display device. When the flexible display screen is in the retracting mode, the first electrode and the second electrode contact each other.

Optionally, the free end of the additional display portion of the flexible display screen is connected to a printed circuit board inside the display device via a flexible printed circuit board.

Optionally, the flexible display screen adopts a GOA to perform partition display driving. The display device further comprises a first switching transistor and a second switching transistor. In the extending mode, the first switching transistor is controlled to be turned on and the second switching transistor is controlled to be turned off, and a display driving control signal is inputted to the entire flexible display screen so that the whole flexible display screen can be used for displaying. In the retracting mode, the first switching transistor is turned off, the second switching transistor is turned on, inputting the display driving control signal to the second additional display portion of the flexible display screen is stopped, and at least a display function of the second additional display portion is turned off.

Optionally, in the display device described above, the flexible display screen is divided into two symmetrical portions, and display driving signals are input concurrently from two sides to halves of a display region.

According to another aspect of the present disclosure, there is further provided a display method applied to the flexible display screen described above. The display method comprises: determining an operating mode required by the flexible display screen; in case of an extending mode, using the entire flexible display for displaying; and in case of a retracting mode, curling at least a portion of the flexible display screen and using an uncurled portion of the flexible display screen for displaying.

Optionally, the flexible display screen described above comprises a main display portion and an additional display portion, the additional display portion further includes a first additional display portion and a second additional display portion, and the display method described above further comprises: in the extending mode, using the main display portion and the first additional display portion to form a plane so as to display a main interface, and using the second additional display portion to form a curved surface so as to display an additional interface.

Optionally, the display method described above further comprises: in the retracting mode, further curling and retracting the second additional display portion.

Optionally, the display method described above further comprises: turning on the entire flexible display screen to display in the extending mode, and turning off at least a display function of the second additional display portion in the retracting mode.

Optionally, the display method described above further comprises: dividing a GOA display driving circuit corresponding to the flexible display screen into two portions, and outputting concurrently a display driving signals respectively from one side of the flexible display screen to a half of a display region of the flexible display screen.

According to the flexible display screen, the display device comprising the flexible display screen and the display method applicable to the flexible display screen of the present disclosure, a display region of the flexible display screen can be extended in the extending mode so that the visual experience of a user is enhanced, and at least a portion of the flexible display screen can be curled and retracted in the retracting mode so that the portability is improved. In addition, a partitioned control can be performed as needed for the displaying on the flexible display screen, and a region of the flexible display screen which is not needed for displaying may be turned off temporarily, so that power consumption of the flexible display screen can be reduced. Meanwhile, the display region of the flexible display screen is divided into at least two portions, and display driving signals are supplied concurrently from both sides to halves of the display region, so that signal transmission delay is reduced and display quality is improved.

BRIEF DESCRIPTION OF THE DRAWINGS

In order to describe the technical solutions in the embodiments of the present disclosure more clearly, drawings of the embodiments will be briefly introduced below. Obviously, the following described drawings relate to only parts of embodiments of the present application, and are not intended to limit the present disclosure.

DETAILED DESCRIPTION OF THE EMBODIMENTS

Hereinafter, the technical solutions in the embodiments of the present disclosure will be described clearly and comprehensively in combination with the drawings. Obviously, the described embodiments are only parts of the embodiments of the present disclosure, rather than all of the embodiments thereof. All the other embodiments obtained by those of ordinary skill in the art based on the embodiments of the present disclosure without inventive works fall into the protection scope of the present disclosure.

According to an aspect of the present disclosure, there is provided a flexible display screen having at least two modes, i.e., an extending mode and a retracting mode, wherein in the extending mode, the entire flexible display screen can be used for displaying, and in the retracting mode, at least a portion of the flexible display screen is curled and an uncurled portion of the flexible display screen can be used for displaying.

Figure 1A:
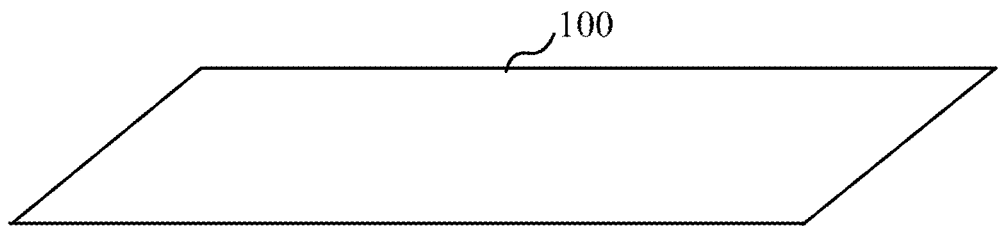
FIGS. 1a-1b are schematic diagrams of appearance of a flexible display screen in different modes according to an embodiment of the present disclosure.
Figure 1B:
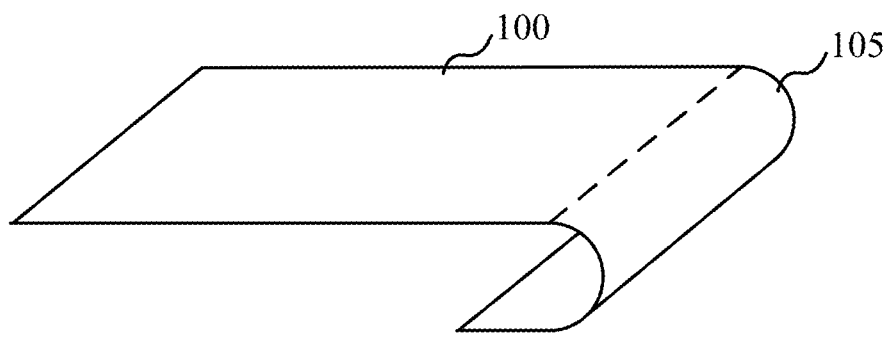

FIGS. 1a-1b are schematic diagrams of appearance of the flexible display screen in different modes. FIG. 1a shows a schematic appearance of the flexible display screen 100 in the extending mode, and FIG. 1b shows a schematic appearance of the flexible display screen 100 in the retracting mode. As shown in FIG. 1a, in the extending mode, the entire of the flexible display screen 100 can be used for displaying, and in the retracting mode, at least a portion of the flexible display screen 100 is curled and an uncurled portion of the flexible display screen can be used for displaying. According to actual needs, the curled portion may display an additional graphical display or turn off a display function separately.

Figure 2A:
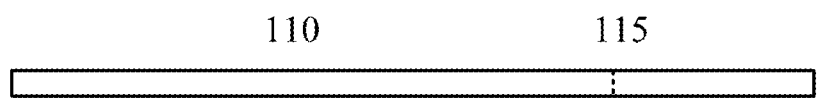
FIGS. 2a-2b are schematic diagrams of side appearance of a flexible display screen in different modes according to an embodiment of the present disclosure.
Figure 2B:
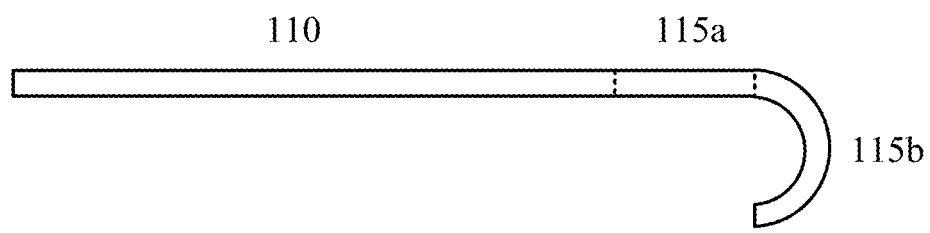

Optionally, the flexible display screen comprises a main display portion 110 and an additional display portion 115. FIG. 2a shows a side view of the flexible display screen. In addition, as shown in FIG. 2b, the additional display portion 115 further includes a first additional display portion 115a and a second additional display portion 115b. In the extending mode, the main display portion 110 and the first additional display portion 115a may form a plane to display a main interface, and the second additional display portion 115b may form a curved surface to display an additional interface.

Optionally, in the retracting mode, the second additional display portion 115b is further curled and retracted. According to actual needs, the display function of second additional display portion 115b which is curled and retracted may be turned off separately, or may also be enabled to continue displaying the additional interface.

According to another aspect of the present disclosure, there is provided a display device comprising the flexible display screen described above. In the extending mode, the main display portion and the first additional display portion of the flexible display screen serve as a main display interface located on a front face of the display device, and the second additional display portion thereof serves as an additional display interface located on an edge of the front face of the display device, so as to achieve the additional display function, for displaying additional information, input instructions for operation controlling, or the like. In the retracting mode, the second additional display portion is curled and retracted inside the display device.

In the following description, a mobile phone is taken as an example of the display device to describe the principles of the present disclosure. However, the principles of the present disclosure are not limited to the case where the display device is a mobile phone. In fact, the principles of the present disclosure may be employed by any electronic device having a display function, such as a mobile phone, a tablet computer, a personal digital assistant (PDA), a navigation system, electronic paper, etc. In an embodiment of the present disclosure, using a mobile phone as the display device is merely exemplary, and is not intended to limit application of the present disclosure.

Figure 3A:
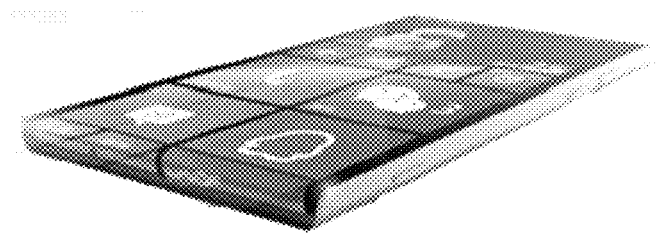
FIGS. 3a-3c are schematic diagrams of appearance of a mobile phone equipped with a flexible display screen in different modes according to an embodiment of the present disclosure.
Figure 3B:
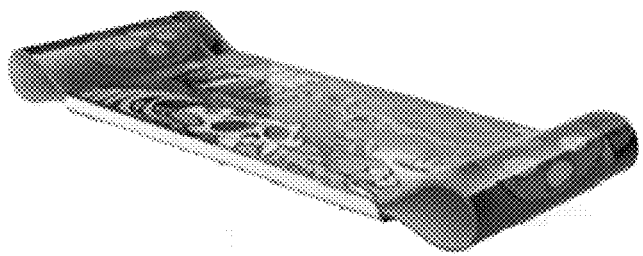
Figure 3C:
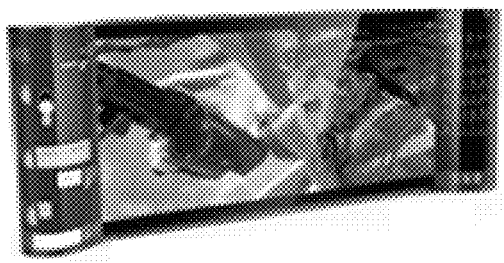

FIGS. 3a-3c show appearance of a mobile phone comprising the flexible display screen described above in different modes. As shown in FIG. 3a, in the retracting mode, appearance of the mobile phone is basically the same as an ordinary mobile phone, the main display portion of the flexible display screen serves as a main display interface of the mobile phone. However, in the extending mode, as shown in FIG. 3b, the additional display portion of the flexible display screen extends at two ends on the front face of the mobile phone, and can display an additional interface. For example, when the user uses the mobile phone as a game console, in the extending mode, a front display screen of the mobile phone displays an image of a game being played, and the additional display portion of the extended flexible display screen may display associated control buttons, so that the user can input instructions such as a direction, a strength or the like to perform game control through the control buttons displayed on the extended flexible display screen. In this way, it is possible to extend the area for displaying an image of the game being played to the maximum extent without occupying the main display screen of the mobile phone, so as to improve the user's visual experience. Optionally, the additional display portion of the extended flexible display screen may also be used for displaying other additional information. For example, while the user is operating the mobile phone as a game console, if a short message is received, the additional display portion may be used for displaying the short message. In this way, even if the user is operating the mobile phone to play a game, the real-time reading of the relevant information is not interfered.

Optionally, in the extending mode, the main display portion of the flexible display screen of the mobile phone forms a plane, and the additional display portion forms a curved surface, so that the user can hold the curved surface as a handle of the game console, facilitating the manipulations of the user.

Optionally, as shown in FIG. 3c, in the extending mode, the main display portion of the flexible display screen of the mobile phone forms a plane for displaying the main interface, and the additional display portion forms a curved surface, which is capable of serving as a supporting member of the mobile phone while displaying the additional interface as needed. For example, while the user is using the mobile phone to play a video, holding the mobile phone for a long time is not beneficial to heat dissipation, and the user will feel tired. In this case, the curved surface formed by the additional display portion may be used as a supporting member to place the mobile phone on a table steadily, so that the user can watch for a long time or many people can watch together.

Optionally, as described above, the additional display portion of the flexible display screen of the mobile phone may include a first additional display portion and a second additional display portion. In the above extending mode, the main display portion to which a main body of the mobile phone corresponds and the first additional display portion form a plane for displaying a main display interface. For example, while the user is using the mobile phone to play a video, the first additional display portion extends the area for displaying an image, so that the user's visual experience can be improved. And the second additional display portion may display an additional interface, for example, buttons for controlling the playing of the video, such as a volume control button, a playback progress control button, or the like. Optionally, the second additional display portion may display text information, such as displaying in real time a short message received by the mobile phone.

In FIGS. 3b-3c, in the extending mode, the additional display portion of the flexible display screen extends symmetrically at both sides of the mobile phone. However, this is merely an example of the present disclosure. In fact, the flexible display screen may extend at only one side of the mobile phone. In addition, the manner in which the mobile phone displays an image is not limited to the above case, either. In fact, the additional display portion of the flexible display screen is not limited to including both the first and second additional display portions, but may include only the second additional display portion. Moreover, in the extending mode, the second additional display portion is not limited to forming a curved surface, but may be designed as forming various shapes as needed. In addition, the first additional display portion may also be designed as a plane at a certain angle with the main display portion. Therefore, the shapes shown in FIGS. 3b-3c are merely examples of the present disclosure and should not be construed as limiting the present invention.

In the retracting mode, as shown in FIG. 3a, the appearance of the mobile phone is basically the same as an ordinary mobile phone, and at least a portion of the additional display portion of the flexible display screen is curled and retracted into a housing of the mobile phone. Optionally, on a side face of the mobile phone, there is an aperture at a position corresponding to the additional display portion of the flexible display screen, the second additional display portion of the flexible display screen is curled and retracted within the housing of the mobile phone, and the first additional display portion is curled, so as to just cover the aperture to prevent dust or other foreign objects from entering inside the housing of the mobile phone.

Optionally, in the retracting mode, both the main display portion corresponding to a front face of the main body of the mobile phone and the first additional display portion corresponding to a side face of the main body of the mobile phone can be used for displaying, wherein the main display portion may display a main interface and the first additional display portion may display an additional interface. For example, the main display portion may be used for displaying an interface related to one program, and the first additional display portion may be used for displaying an interface related to another program. For example, the main display interface may display a file processing program, such as a PDF document, a WORD document or a PPT document, and the first additional display portion may be used for displaying a music playing program, so that the user can listen music and control music playing while reading a document, without needing to switch the document being displayed on the main interface for controlling the playing of music such as selecting another music to play, controlling a playback process or the like, and thus a real concurrent processing for multiple tasks can be achieved.

Optionally, if a backside of the mobile phone is made into a transparent surface, then in the retracting mode, the second additional display portion retracted inside the housing of the mobile phone may also display a separate additional display interface different from the main interface.

Figure 4A:
FIGS. 4a-4c are schematic diagrams of structure of a mobile phone in different modes with the flexible display screen supported by a bracket, according to an embodiment of the present disclosure.
Figure 4B:
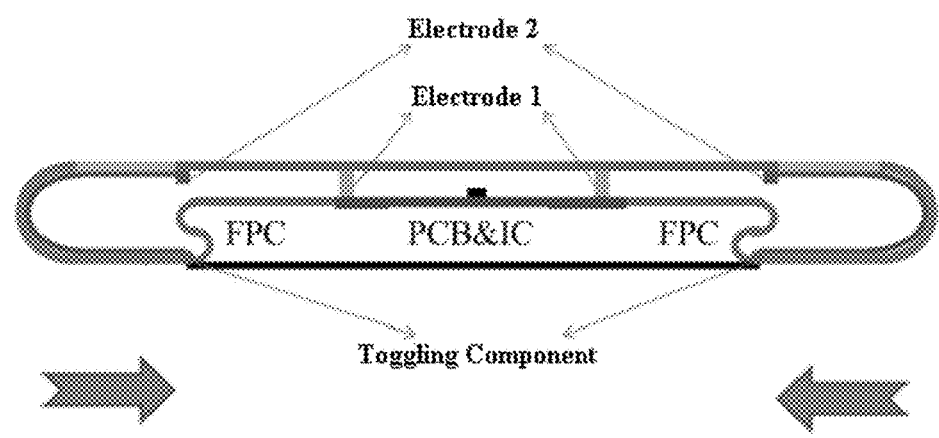
Figure 4C:
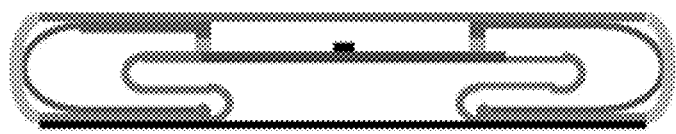

According to an embodiment of the present disclosure, the mobile phone may adopt a display screen structure of symmetrical extension at two ends of the upper end and the lower end. Alternatively, it is possible to adopt the extended display screen structure only at the upper or lower end. As an example, when the display screen structure of symmetrical extension is adopted at both the upper and lower ends of the mobile phone, the display screen of the mobile phone may be divided into 5 portions. As shown in FIG. 4*a*, as the same flexible display screen, the main display portion A is a front display screen and is in an irremovable and unbendable state, and the additional display portions B and C may be moved or bended according to a change of an operating state of the mobile phone. As an example, FIGS. 4*b*-4*c* are schematic side views of the mobile phone in different operating modes, wherein when the mobile phone is in the extending mode, portion B and portion A form a plane, and portion C forms a curved surface with a curvature. In order to provide mechanical support for the portions B and C of the flexible display screen in the extending mode, in the embodiment, a removable bracket is adopted. When the mobile phone is in the extending mode, the bracket passes through an aperture on a side face of the display device to slide outside the display device, so as to support portions B and C of the flexible display screen. As an example, the bracket may be made of metal or other solid material, such as plastic, and no limitation is made herein. Optionally, elastic material may be adopted to produce the bracket, so as to enhance the user's operation handfeel. As shown in FIGS. 4*b*-4*c*, the bracket may adopt a U-shape, and the bracket may slide along a horizontal direction, wherein in the extending mode, the bracket is pulled out, an upper surface of the bracket joints with the portion B of the flexible display screen, a lower surface of the bracket joints with a flat portion of the portion C of the flexible display screen, and a curved portion of the bracket joints with the curved portion of the portion C of the flexible display screen. In this way, in the extending mode, the extended portions B and C of the flexible display screen are supported by means of the bracket, so that at least a portion of the portions B and C of the flexible display screen may serve as a portion with which the user can hold the mobile phone or serve as a supporting member with which the mobile phone can be placed on a desktop. For example, when a user uses the mobile phone as a game console, at least a portion of the additional display portion may serve as a handle of the game console. In the retracting mode, the bracket slides inside the display device, the portion C of the flexible display screen is retracted inside the housing of the mobile phone, and the portion C of the flexible display screen envelops the curved portion of the bracket, and covers the aperture at the side face of the mobile phone. It should be noted that, in the example shown in FIGS. 4*b*-4*c*, an electrode is mounted at an end of an upper side plane of the bracket, this electrode contacts an electrode mounted on a Printed Circuit Board (PCB) inside the mobile phone in the retracting mode, so that the bracket can be detected in the retracting mode whether it is in a homing state of being totally retracted inside the housing of the mobile phone. In addition, in this example, the free end of the portion C of the flexible display screen is electrically connected to the PCB inside the mobile phone via a flexible printed circuit board (FPC), so that a loop of an electrical signal can be formed. When the mobile phone is in the retracting mode, the FPC is naturally bent as the bracket is retracted. In addition, a toggling component may be installed at an end of a lower side plane of the bracket, so that the user can move the bracket via this toggling component to extend or retract the portions B and C of the flexible display screen.

Figure 5A:
FIGS. 5a-5c are schematic diagrams of structure of a mobile phone in different modes with the flexible display screen supported by a bracket, according to another embodiment of the present disclosure.
Figure 5B:
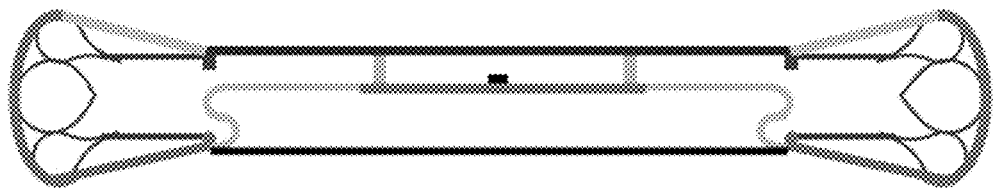
Figure 5C:
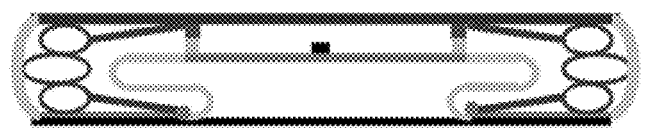

According to another embodiment of the present disclosure, the U-shaped bracket shown in FIGS. 4*a*-4*c* is replaced with a bracket comprising several annular frames. For example, as shown in FIG. 5*a*, the bracket comprises three annular frames. However, the number of annular frames may be disposed as needed, and is not limited to the number provided in this embodiment. FIGS. 5*b*-5*c* show a schematic diagram of appearance of the mobile phone in the extending mode or the retracting mode, respectively, in this embodiment. In the extending mode, the bracket is pulled out to support the portions B and C of the flexible display screen together, the portion B of the flexible display screen forms an inclined plane at a certain angle with the main display portion A, and the portion C of the flexible display screen forms a curved surface with a curvature and a plane at a lower side. In a case where the bracket adopts elastic material, in the extending mode, respective annular frames are in an unfolded state and support parts B and C of the flexible display screen. As shown in FIG. 5*b*, the upper and lower surfaces of the bracket may not joint with the portion B or portion C of the flexible display screen, instead, elasticity of the bracket is used to support the flexible display screen. In FIG. 5*c*, when the mobile phone is in the retracting mode, the bracket is moved inside the housing of the mobile phone, and the portion B of the flexible display screen envelops the bracket, and covers the aperture at the side face of the mobile phone. As described above, in this way, in the extending mode, by means of using the bracket, the extended portions B and C of the flexible display screen can be supported, and at least a portion of the portions B and C of the flexible display screen can from a handle with which the user holds the mobile phone or can serve as a supporting member with which the mobile phone is placed on a desktop. In the retracting mode, the bracket is compressed elastically and slides inside the mobile phone, the portion C of the flexible display screen is retracted inside the mobile phone, and the portion B of the flexible display screen envelops an outer edge of the annular frame of the bracket to cover the aperture at the side face of the mobile phone. It should be noted that, in the example shown in FIGS. 5*b*-5*c*, an electrode is mounted at an end of an upper side annular frame of the bracket, and in the retracting mode, this electrode contacts an electrode mounted on a Printed Circuit Board (PCB) inside the mobile phone, so that, in the retracting mode, it is possible to detect whether the bracket is in a homing state of being totally retracted inside the housing of the mobile phone. In addition, in this example, the free end of the portion C of the flexible display screen is electrically connected to the PCB inside the mobile phone via a flexible printed circuit board (FPC), so that a loop of an electrical signal can be formed. When the mobile phone is in the retracting mode, the FPC is naturally bent along the bracket is retracted. In addition, a toggling component may be installed at an end of a lower side plane of the bracket, so that the user can move the bracket via this toggling component, so as to extend or retract the portions B and C of the flexible display screen.

In FIGS. 4*b*-4*c* and 5*a*-5*c*, examples of shape of the bracket for supporting the additional display portion of the flexible display screen are provided. However, it should be understood, this bracket may adopt various shapes as needed, but is not limited to being U-shaped or comprising a plurality of annual frames as exampled in the present disclosure, instead, the shape of the bracket may be selected properly according to the factors such as material adopted for the bracket, a deflection of the flexible display screen, a shape into which the additional display portion of the flexible display screen needs to form, and so on.

According to another aspect of the present disclosure, in order to reduce power consumption of the display screen, the flexible display screen may be divided into several portions, and controlled in cooperation with switching transistors (e.g., thin film transistors TFT), so that a display function of a certain portion of the flexible display screen may be turned on or off as needed. In other words, a partitioned control may be implemented for the flexible display screen so as to reduce power consumption. Meanwhile, by means of inputting signals concurrently from the two sides of the flexible display screen, a signal transmission delay can be eliminated, and a display quality of the flexible display screen can be ensured.

Figure 6:
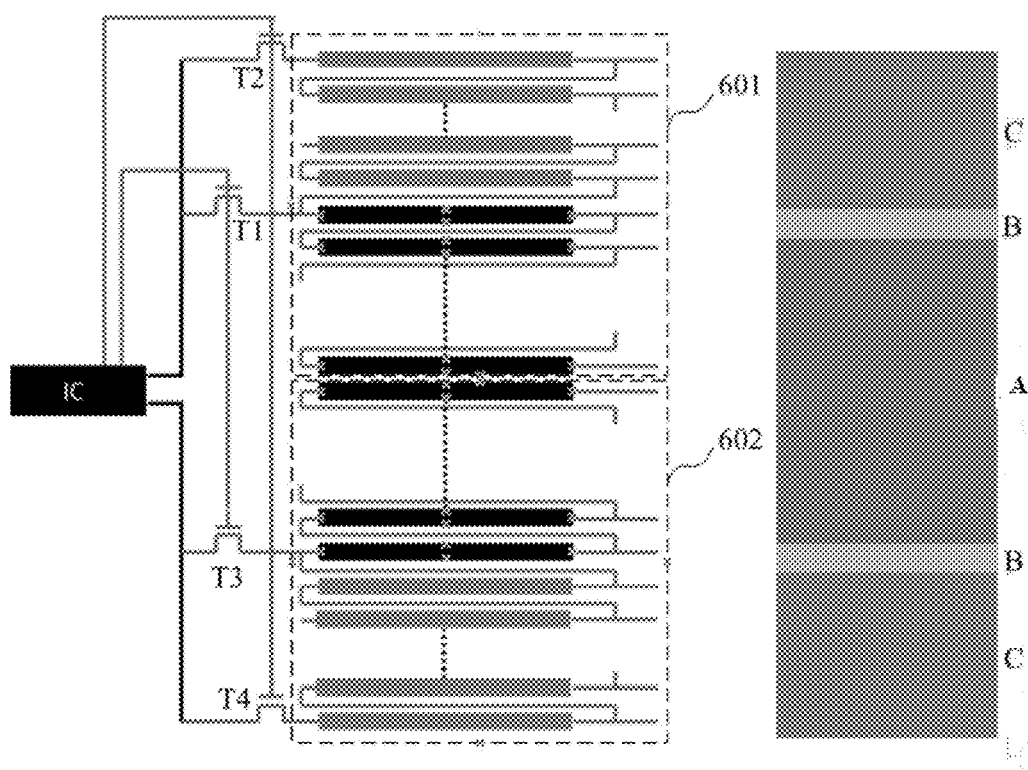
FIG. 6 is a schematic diagram of performing a partitioned display driving to a flexible display screen according to an embodiment of the present disclosure.

For example, as shown in the right part of FIG. 6, the entire flexible display screen is divided into two symmetrical portions in terms of signal supplying, which are provided with display driving signals concurrently by GOA driving circuits 601 and 602 in the top and in the bottom of the left part of FIG. 6, respectively. As an example, specific structures of the GOA driving circuits 601 and 602 are not shown herein, instead, only the relationship that respective scanning lines are connected in series are schematically shown. In fact, a conventional GOA circuit may be adopted as the GOA driving circuits 601 and 602 herein, so as to implement display driving of the flexible display screen shown in the right part of FIG. 6, but the display driving for respective portions of the flexible display screen is required to be controlled separately. As shown in the left part of FIG. 6, display driving signals of the GOA driving circuits 601 and 602 are independent of each other, driving a half area of the entire flexible display, respectively. Inside the GOA driving circuit 601, a first switching TFT T1 is connected to a signal input terminal at a signal input terminal of a driving circuit of the first additional display portion B corresponding to an upper half of the flexible display screen (e.g., a first scanning line of the first additional display portion B), and a second switching TFT T2 is connected to a signal input terminal at a signal input terminal of a driving circuit of the second additional display portion C corresponding to an upper half of the flexible display screen (e.g., a first scanning line of the second additional display portion C). Likewise, a third switching TFT T3 and a fourth switching TFT T4 are configured at a lower half of the flexible display screen in a similar way. As an example, a gate of the second switching TFT T2 and a gate of the fourth switching TFT T4 are connected together to receive a switch control signal provided by a control IC, and a gate of the first switching TFT T1 and a gate of the third switching TFT T3 are connected together to receive a switch control signal provided by the control IC. Drains of respective switching TFTs receive display driving signals provided by the control IC, and the display driving signals are outputted to corresponding portions of the flexible display screen via sources of respective switching TFTs. In the retracting mode, the control IC outputs a signal to turn on the first switching TFT T1 and the third switching TFT T3, and turn off the second switching TFT and the fourth switching TFT, so that the GOA driving circuit corresponding to the main display portion A and the first additional display portion B receives a corresponding display driving signal, and the GOA driving circuit corresponding to the second additional display portion C does not receive a display driving signal, and thus an image is displayed only on the main display portion A and the first additional display portion B. In the extending mode, the control IC outputs a signal to turn on the second switching TFT T2 and the fourth switching TFT T4 and turn off the first switching TFT T1 and the third switching TFT T3, so that the GOA driving circuit corresponding to the second additional display portion C of the flexible display screen receives a corresponding display driving signal, and the display driving signal is provided to a subsequent GOA driving circuit corresponding to the second additional display portion B and the main display portion A through the GOA driving circuit corresponding to the first additional display portion C, enabling the entire flexible display screen to display an image in all the area. In this way, a certain portion of the flexible display screen may be controlled to display or a display function of a certain portion thereof may be turned off as needed. For example, when the mobile phone is in the retracting mode, a display function of the second additional display portion C may be turned off to reduce power consumption of the display screen.

In the example shown in FIG. 6, the first additional display portion B and the second additional display portion C of the flexible display screen may be controlled respectively. Of course, the above described manner is merely an example of the principles of the present disclosure, not a limitation to the principles of the present disclosure. In fact, the displaying on both the first additional display portion B and the second additional display portion C may be controlled concurrently, and the displaying on the main display portion A may be controlled separately, for which only an adjustment of the positions of the first switching TFT T1 and the third switching TFT T3 in FIG. 6 is required, that is, the drain of the first switching TFT T1 is connected to the signal input terminal of the GOA driving circuit corresponding to the upper half of the main display portion A (e.g., the first scanning line of the main display portion A), and the drain of the third switching TFT T3 is connected to the signal input terminal of the GOA driving circuit corresponding to the lower half of the main display portion A (e.g., the last scanning line of the main display portion A).

In the solution of partitioned display driving for the flexible display screen shown in FIG. 6, by means of driving the flexible display screen concurrently from both upper and lower sides, a signal delay is reduced, and a display quality of the display screen is improved, and a display function of a certain portion of the display screen may be turned off as needed so as to reduce power consumption, through which an endurance of the mobile phone can be lengthened.

According to the above-mentioned principles of the present disclosure, when the flexible display screen has a touch function, for example, when the flexible display screen serves as a touch screen of the mobile phone, the above described partitioned control manner may also be applied to a touch driving circuit of the flexible display screen. For example, touch detections for the main display portion A and the additional display portions B and C may be controlled respectively. In the extending mode, the touch detection functions of the main display portion A, the first additional display portion B and the second additional display portion C are all activated, while in the retracting mode, only the touch detection functions of the main display portion A and the first additional display portion B are activated, the touch detection function on the second additional display portion C is turned off. As a result, power consumption of the display screen is further reduced.

In the above embodiment, although the principles of the present disclosure are explained with the mobile phone as an example, the principles of the present disclosure are not limited to being applied to the mobile phone, but may be applied to various electronic devices having a display function, including but not limited to a PDA, a tablet computer, a navigation system, a liquid crystal display, electronic paper, or the like.

Figure 7:
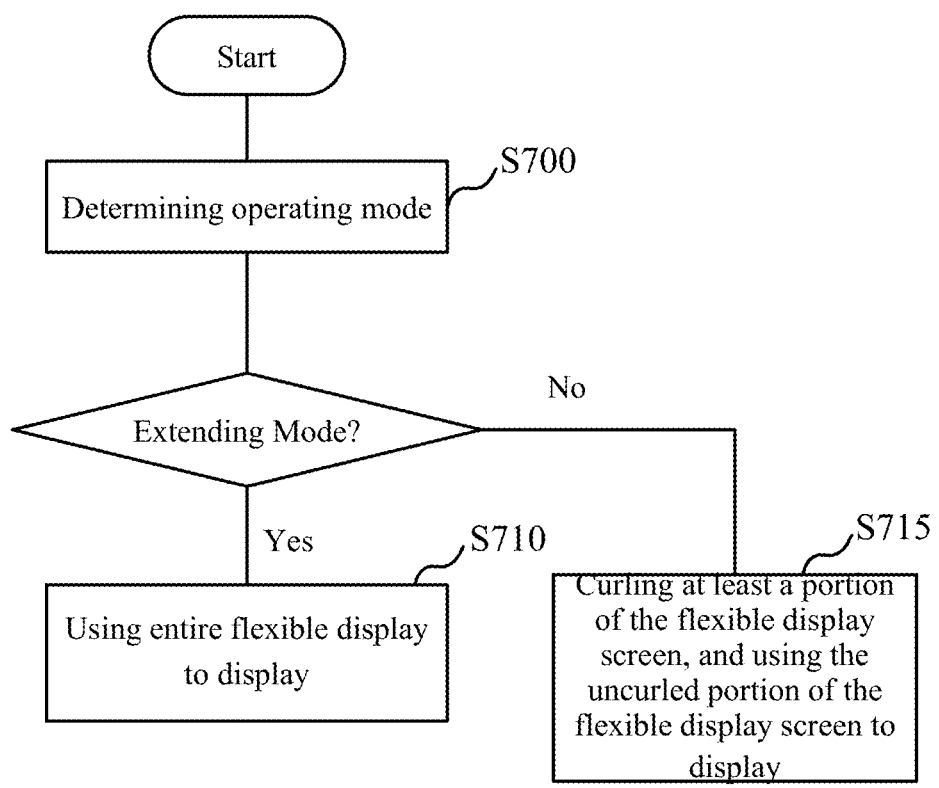
FIG. 7 is a schematic flowchart of a display method applicable to the flexible display screen described above according to an embodiment of the present disclosure.

According to another aspect of the present disclosure, there is further provided a display method applied to the flexible display screen described above. FIG. 7 is a schematic flowchart of a display method applicable to the flexible display screen described above according to an embodiment of the present disclosure. As shown in FIG. 7, in S700, an operating mode required by the flexible display screen is determined; in S710, if it is an extending mode, the entire flexible display is used for displaying; in S715, if it is a retracting mode, at least a portion of the flexible display screen is curled, and an uncurled portion of the flexible display screen is used for displaying.

Optionally, the flexible display screen described above comprises a main display portion and an additional display portion, the additional display portion further includes a first additional display portion and a second additional display portion, and the display method described above further comprises: in the extending mode, using the main display portion and the first additional display portion to form a plane so as to display a main interface, and using the second additional display portion to form a curved surface so as to display an additional interface.

Optionally, the display method described above further comprises: further curling and retracting the second additional display portion in the retracting mode.

Optionally, the display method described above further comprises: turning on the entire flexible display screen to display in the extending mode, and turning off a display function of the second additional display portion in the retracting mode.

Optionally, the display method described above further comprises: dividing a GOA display driving circuit, to which the flexible display screen corresponds, into two portions, and outputting display driving signals concurrently, from one side of the flexible display screen to a half of a display region of the flexible display screen, respectively.

According to the display method of the present disclosure, a display region of the flexible display screen can be extended in the extending mode so that the visual experience of a user is enhanced, and at least a portion of the flexible display screen can be curled and retracted in the retracting mode so that the portability is improved. In addition, a partitioned control can be performed as needed for the displaying on the flexible display screen, and a region of the flexible display screen which is not needed for displaying may be turned off temporarily, so that power consumption of the flexible display screen can be reduced. Meanwhile, the display region of the flexible display screen is divided into at least two portions, and display driving signals are supplied concurrently from both sides to halves of the display region, so that signal transmission delay is reduced and display quality is improved.

Unless defined otherwise, technical terms or scientific terms used herein shall have common meanings known by those skilled in the art of the present disclosure. Wordings and expressions such as "first", "second" and the like used in the specification and claims of the present disclosure do not denote any sequence, quantity or priority, but distinguish different components. Likewise, wordings such as "a", "an", "the" and the like do not denote quantitative restrictions, but denote the presence of at least one. Wordings such as "include", "comprise" and the like refer to that an element or an object before this word contains all the elements or objects listed thereinafter or alternatives thereof, without excluding other elements or objects. Wordings such as "connected", "connecting" and the like are not restricted to physical or mechanical connections, but may include electrical connections, regardless of direct or indirect connections. Wordings such as "up", "below", "left", "right" and so on are only used to denote relative positional relationship, once an absolute position of the described object changes, the relative positional relationship may probably change correspondingly.

In addition, reference in this specification to "one embodiment," "an embodiment" of the present disclosure or other variants means that a particular feature, structure, or characteristic described in connection with the embodiment is included in at least one embodiment of the present disclosure. Therefore, various appearances of the phrases such as "in an embodiment", "in one embodiment" or other variants throughout the specification are not necessarily referring to the same embodiment.

The above described are merely some embodiments of the present disclosure, however, the protection scope of the present disclosure is limited thereto, modifications or replacements that are easily conceivable for those skilled in the art within the technique range disclosed in the present disclosure should all fall into the protection scope of the present disclosure. The protection scope of the present disclosure should be defined by the appended claims.

The present application claims the priority of the Chinese patent application No. 201510388463.4 filed on Jul. 3, 2015, the entirety of which is incorporated as part of the present application by reference herein.

What is claimed is:

1. A flexible display screen (100) having an extending mode and a retracting mode, wherein in the extending mode, the entire flexible display screen is used for displaying, and in the retracting mode, at least a portion (105) of the flexible display screen is curled and an uncurled portion of the flexible display screen is used for displaying, wherein the flexible display screen adopts a GOA driving circuit to perform a partitioned display driving,
wherein the flexible display screen (100) comprises a main display portion (110) and an addition display portion (115), the additional display portion having a free end capable of being curled, and wherein the additional display portion includes a first additional display portion (115*a*) and a second additional display portion (115*b*), the second additional display portion being curled and retracted in the retracting mode, and
wherein in the extending mode, a first switching transistor is controlled to be turned on and a second switching transistor is controlled to be turned off, a display driving control signal is inputted to the entire flexible display screen, and in the retracting mode, the first switching transistor is turned off and the second switching transistor is turned on, inputting of the display driving control signal to the second additional display portion of the flexible display screen is stopped.

2. The flexible display screen according to claim 1, wherein, in the extending mode, the main display portion (110) and the first additional display portion (115*a*) form a plane to display a main interface, and the second additional display portion (115*b*) forms a curved surface to display an additional interface.

3. A display device comprising the flexible display screen according to claim 1, wherein the main display portion is located on a front face of the display device, and the additional display portion is located on an edge of the main display portion.

4. The display device according to claim 3, further comprising at least one slideable bracket, wherein, in the extending mode, at least a portion of the bracket passes through an aperture on a side face of the display device to slide outside the display device, so as to support the additional display portion of the flexible display screen, and in the retracting mode, the bracket slides inside the display device so that the second additional display portion is retracted inside the display device and the first additional display portion covers the aperture on the display device.

5. The display device according to claim 4, wherein a backside of the display device is transparent, and in the retracting mode, the second additional display portion displays through the backside of the display device.

6. The display device according to claim 4, wherein the bracket is U-shaped, and in the extending mode, at least a portion of the bracket is pulled outside the display device to support the additional display portion of the flexible display screen.

7. The display device according to claim 4, wherein the bracket comprises a plurality of resilient annular members, and when at least a portion of the bracket is pulled outside the display device, the plurality of resilient annular members support the additional display portion together.

8. The flexible display screen according to claim 1, wherein the GOA driving circuit inputs display driving control signals to the flexible display screen concurrently from two sides.

9. A display method applied to the flexible display screen according to claim 1, the method comprising:
determining (S700) an operating mode required by the flexible display screen;
in case of the extending mode, using the entire flexible display screen for displaying (S710); and
in case of the retracting mode, curling at least a portion of the flexible display screen and using the uncurled portion of the flexible display screen for displaying (S720).

10. The display method according to claim 9, wherein in the extending mode, the entire flexible display screen is turned on to display, and in the retracting mode, the second additional display portion is curled and retracted, and a display function thereof is turned off.

11. The display method according to claim 10, wherein in the extending mode, the main display portion and the first additional display portion form a plane to display a main interface, and the second additional display portion forms a curved surface to display an additional interface.

12. A display device comprising the flexible display screen according to claim 2, wherein the main display portion is located on a front face of the display device, and the additional display portion is located on an edge of the main display portion.

13. The display device according to claim 12, further comprising at least one slideable bracket, wherein, in the extending mode, at least a portion of the bracket passes through an aperture on a side face of the display device to slide outside the display device, so as to support the additional display portion of the flexible display screen, and in the retracting mode, the bracket slides inside the display device so that the second additional display portion is retracted inside the display device and the first additional display portion covers the aperture on the display device.

14. The display device according to claim 13, wherein a backside of the display device is transparent, and in the retracting mode, the second additional display portion displays through the backside of the display device.

15. The display device according to claim 13, wherein the bracket is U-shaped, and in the extending mode, at least a portion of the bracket is pulled outside the display device to support the additional display portion of the flexible display screen.

16. The display device according to claim 13, wherein the bracket comprises a plurality of resilient annular members, and when at least a portion of the bracket is pulled outside the display device, the plurality of resilient annular members support the additional display portion together.

17. The display method according to claim 9, wherein the GOA driving circuit inputs display driving control signals to the flexible display screen concurrently from two sides.

* * * * *